E. BALDWIN.
HOSE COUPLING.
APPLICATION FILED MAY 16, 1914.
1,127,579.
Patented Feb. 9, 1915.
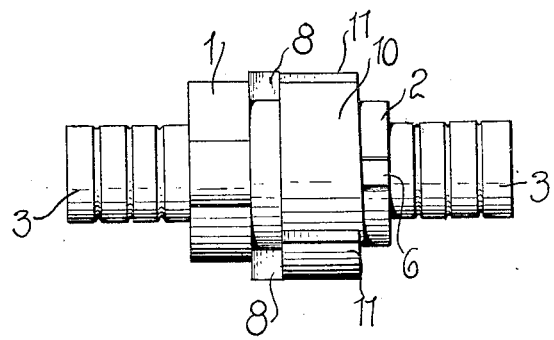
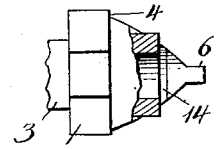
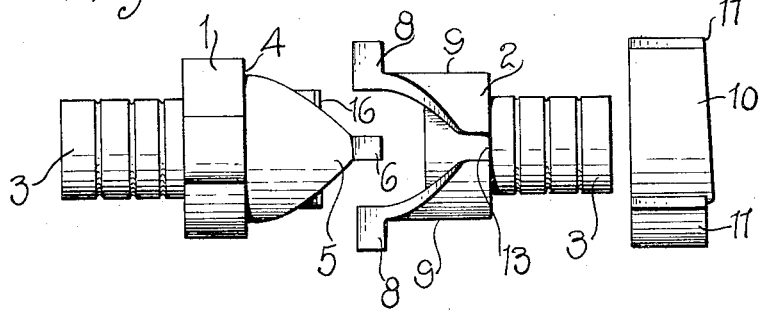
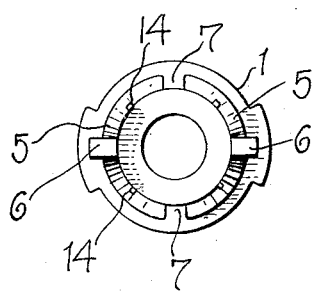
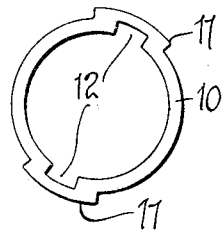
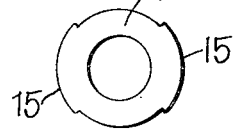
Inventor
E. BALDWIN
By Watson E. Coleman
Attorney
Witnesses
Robert M. Sutphen
A. J. Hird.

UNITED STATES PATENT OFFICE.

ERNEST BALDWIN, OF SALT LAKE CITY, UTAH.

HOSE-COUPLING.

1,127,579.     Specification of Letters Patent.     Patented Feb. 9, 1915.

Application filed May 16, 1914. Serial No. 839,109.

*To all whom it may concern:*

Be it known that I, ERNEST BALDWIN, a citizen of the United States, residing at Salt Lake City, in the county of Salt Lake and State of Utah, have invented certain new and useful Improvements in Hose-Couplings, of which the following is a specification, reference being had to the accompanying drawings.
This invention relates to new and useful improvements in hose couplings, and an object thereof is to provide a coupling in which the members may be quickly and easily connected together, in a water tight manner, and may be readily disconnected when desired.

Another object of this invention is to provide a detachable hose coupling. the members of which are provided with oppositely disposed longitudinal inter-engaging tapered extensions. the extensions having radial lugs at their extremities, for engagement with the opposite edges of a locking ring. whereby the members are connected together to hold the sections of hose against longitudinal strain.

With these and other objects in view. my invention consists in the novel construction, combination and arrangement of parts, to be hereinafter more fully described, claimed, and illustrated in the accompanying drawing. in which, Figure 1 is a side elevational view of my improved coupling showing the members thereof connected together; Fig. 2 is a side elevational view of my improved coupling, showing the members disconnected; Fig. 3 is an inner end view of one of the members; Fig. 4 is an edge view of the locking ring;
and Fig. 5 is an elevational view of the gasket which is interposed between the members of the coupling; and Fig. 6 is a detail view showing the transverse groove in one of the extensions of one of the members, which is adapted to receive one of the projections on the gasket shown in Fig. 5.

Referring more particularly to the drawing the numerals 1 and 2 designate the members of my improved coupling. each of the members being cylindrical in form and being provided with reduced rearward extensions 3. to which the sections of hose pipe may be connected in the ordinary manner.
The member 1 is provided at its rear end, with an annular rib 4, from which projects oppositely disposed forwardly extending tapered wings or extensions 5, the wings extending beyond the forward extremity of the member and being provided with radially extending lugs 6 at their extremities. The opposite edges of the extensions 5 at their inner ends are spaced to provide seats 7 to receive the lugs 8 on the extremities of the corresponding tapered extensions 9 which project from the member 2.

A locking ring 10 having a beveled edge is provided to connect the members of the coupling together, the ring being provided at diametrically opposite points with radially offset portions 11, which form transversely extending grooves 12, by means of which the ring may be passed over the lugs 6 of the member 1, when the members are engaged against each other and it is desired to connect the same together. The opposing edges of the extensions 9 are also spaced at their inner ends to provide seats 13, to receive the lugs 6 of the section 1, and the inner faces of the tapered extensions 5 closely adjacent to the extremity of the section 1 are provided with transversely extending grooves 14 which extend entirely across the extensions to receive the oppositely disposed radial projections 15 on a gasket 16, which is engaged against the inner end of the section 1.

In the practical use of my improved coupling, the sections of the hose are connected to the members of the coupling in the ordinary manner and when it is desired to connect the sections of hose together, the extensions of the members of the coupling are engaged between each other and the members are moved toward each other until the lugs 8 abut against the rib 4. When the members are in this position. the gasket 16 engages the end of the member 2, and the ring 10 is disposed so that the grooves therein may pass over the lugs 6, whereupon the ring is moved longitudinally of the coupling until it engages against the lugs 8 of the member 2. The ring is then rotated so that the beveled edge thereof engages the lugs 6 and draws the members together to compress the gasket 16 whereby the members of the coupling are coupled in a water tight manner. It will be noted that by providing the gasket with the projections 15 which engage in the grooves 14 of the extensions 5, the gasket is carried by the member 1 at all times, whether the same is connected to the member 2 or not.

From the above description taken in connection with the drawing, it will be seen that I have provided a coupling by means of which two sections of hose may be quickly and easily connected together or disconnected, and that the coupling comprises only three parts, whereby the same may be cheaply manufactured and will be extremely efficient in use.

Having thus fully described my invention, what I desire to claim and secure by Letters Patent is:—

1. A hose coupling comprising two members having longitudinally tapered extensions on opposite sides thereof, said extensions projecting beyond the opposed ends of the members and being provided with radially extending lugs at their extremities, each of said lugs having parallel side walls, the opposite edges of said extensions at their juncture with the members being spaced apart to provide seats, the opposing edges of the extensions at their juncture with the members being arranged parallel with each other, the lugs on the extension of one member being adapted to engage in the seats between the extensions of the other member, and a locking ring for engagement between the lugs to detachably lock the members together.

2. A hose coupling comprising two members having longitudinally tapered extensions on opposite sides thereof, said extensions projecting beyond the opposed ends of the members and being provided with radially extending lugs at their extremities, the opposite edges of the extensions at their juncture being spaced apart to provide seats, the lugs on the extensions of one member being adapted to engage in the seats between the extensions on the other member, a gasket adapted for engagement against the opposing end of one member between its extensions, said gasket having oppositely disposed radial projections, the inner faces of the extensions of the member on which the gasket is mounted being provided with transversely extending grooves to receive the projections of the gasket, and a locking ring for engagement between the lugs to detachably lock the members together.

In testimony whereof I hereunto affix my signature in the presence of two witnesses.

ERNEST BALDWIN.

Witnesses:
CHAS. H. BROWN,
F. SPENCER.

Copies of this patent may be obtained for five cents each, by addressing the "Commissioner of Patents, Washington, D. C."